Figures 1, 2:
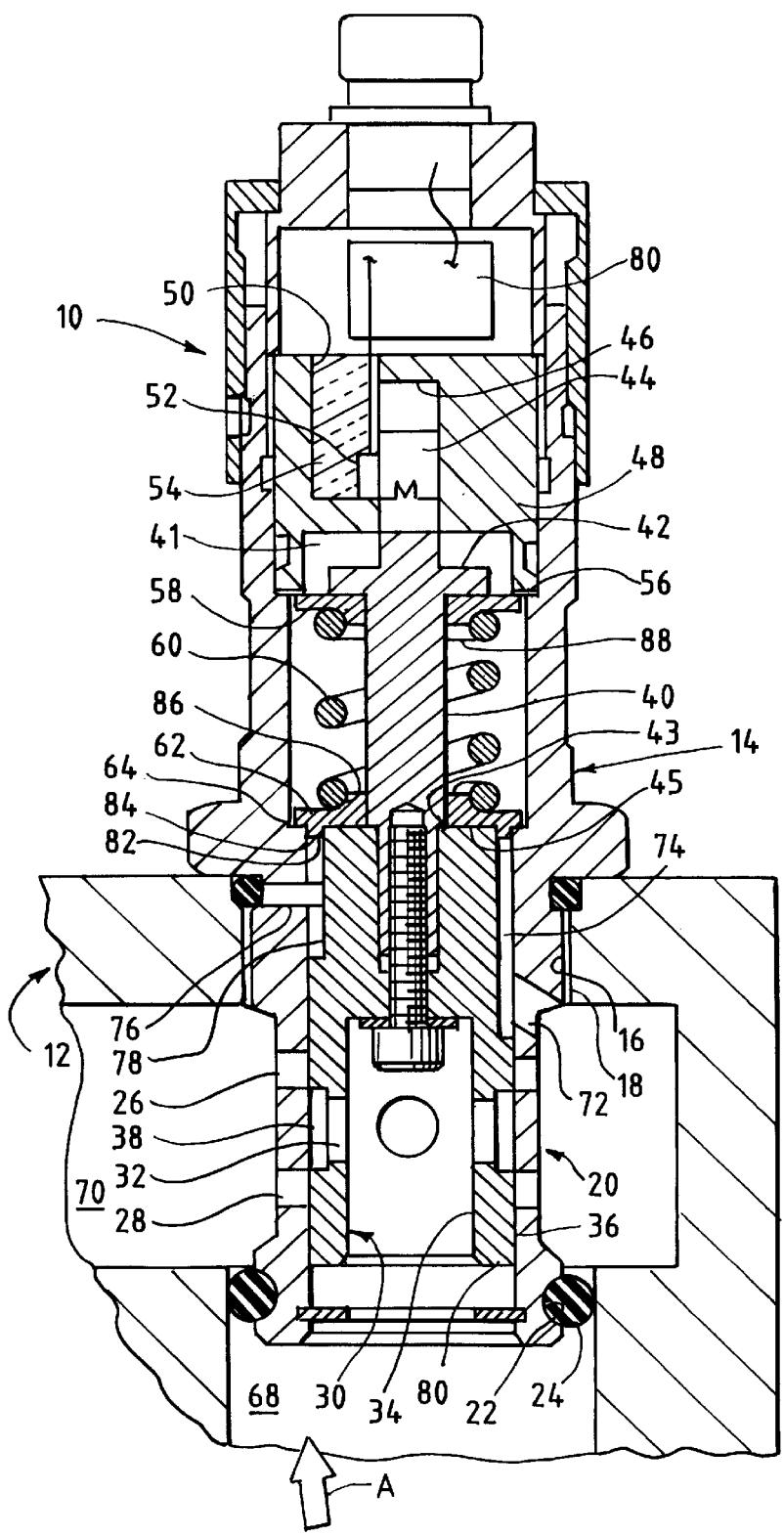

United States Patent
Kadlicko

[11] Patent Number: 5,827,978
[45] Date of Patent: *Oct. 27, 1998

[54] FLOW TRANSDUCER

[75] Inventor: George Kadlicko, Ontario, Canada

[73] Assignee: Microhydraulics, Inc., Mississauga, Canada

[*] Notice: The term of this patent shall not extend beyond the expiration date of Pat. No. 5,313,844.

[21] Appl. No.: 647,279

[22] Filed: May 13, 1996

Related U.S. Application Data

[63] Continuation of Ser. No. 361,641, Dec. 22, 1994, abandoned.

[51] Int. Cl.$^6$ .................................................. G01F 1/22
[52] U.S. Cl. ........................................................ 73/861.54
[58] Field of Search ........................ 73/861.54, 861.58

[56] References Cited

U.S. PATENT DOCUMENTS

| | | | |
|---|---|---|---|
| 3,112,646 | 12/1963 | English | 73/861.54 |
| 4,304,136 | 12/1981 | McCabe et al. | |
| 4,366,718 | 1/1983 | Nelson | |
| 4,459,860 | 7/1984 | Walters | |
| 4,507,976 | 4/1985 | Banko | |
| 4,619,146 | 10/1986 | Teodorescu et al. | |
| 4,811,607 | 3/1989 | Walters et al. | |
| 5,024,105 | 6/1991 | Tentler et al. | |
| 5,115,684 | 5/1992 | Haeussler | |
| 5,313,844 | 5/1994 | Kadlicko | 73/861.54 |
| 5,440,925 | 8/1995 | Padden et al. | 73/861.54 |

FOREIGN PATENT DOCUMENTS

| | | |
|---|---|---|
| 244976 | 4/1987 | European Pat. Off. |
| 427102 | 10/1990 | European Pat. Off. |
| 0505958 | 3/1992 | European Pat. Off. |
| 2931215 | 8/1979 | Germany |
| 9006243 | 6/1990 | Germany |
| 2123964 | 7/1983 | United Kingdom |
| 9325868 | 12/1993 | WIPO |

*Primary Examiner*—Richard Chilcot
*Assistant Examiner*—Jewel V. Artis
*Attorney, Agent, or Firm*—Ladas & Parry

[57] ABSTRACT

A flow transducer includes a piston movable in a sleeve to vary the area of an orifice. The piston may move in either direction from a position in which flow is prevented. Movement in both directions is opposed by a spring. The piston assumes a unique position for each flow rate and the position of the transducer is sensed to provide a signal indicative of low rate.

5 Claims, 1 Drawing Sheet

| X | Q | V |
|---|---|---|
| $X_1$ | $Q_1$ | $V_1$ |
| $X_2$ | $Q_2$ | $V_2$ |
| ... | ... | ... |
| $X_n$ | $Q_n$ | $V_n$ |

FLOW TRANSDUCER

This is a continuation of application Ser. No. 08/361,641 filed on Dec. 22, 1994 now abandoned.

The present invention relates to a flow transducer.

Flow transducers are used to determine the rate of flow of fluid in a duct or conduit and as such provide information about a fundamental parameter of most fluid systems. Fluid flow is, however, difficult to measure and most commercially available transducers provide a time-averaged indication of the flow rate rather than a dynamic indication of the flow rate. Thus the transducers require a certain period to make observations and then provide a signal indicative of the average flow rate over that period. For example, one commonly used flow transducer utilizes a turbine located within the conduit and a sensor determines the rotation of the turbine and provides a signal that indicates the rate of flow of fluid through the conduit.

Accurate monitoring or control of a fluid system depends upon the dynamic measurement of the flow in the system but at the same time it is important that the flow within the system is not disturbed by the measuring equipment. Moreover, it is desirable that the monitoring apparatus is capable of measuring small variations in relatively large flow rates and that it be robust and reliable.

Various proposals have been made to provide dynamic measurement of flow rates but none of these provide the versatility and accuracy necessary. U.S. Pat. No. 4,304,136 to McCabe; U.S. Pat. No. 4,507,976 to Banko and U.S. Pat. No. 4,619,146 to Teodorescu each show a dynamic flow meter in which a piston progressively exposes an orifice as flow rates increase with the position of the piston being indicative of the flow rate. These devices are, however, unidirectional and accordingly can only accomodate flows in one direction.

U.S. Pat. No. 4,366,718 to Nelson and U.S. Pat. No. 4,459,860 to Walters disclose a bidirectional device capable of measuring flows in each direction. In each of these patents, a movable piston is maintained centred at a no flow position relative to a fixed member by means of a pair of springs acting on opposite ends of the movable member. With each of these devices, the central position requires alignment between a pair of knife edges. However, in order to attain this position, the springs must be accurately matched as any difference in the length of the springs will offset the movable member. This will produce a non-linear response at low flow rates. In U.S. Pat. No. 5,313,844 a flow transducer is shown in which many of the aforesaid difficulties are obviated, in part by providing a construction that is simple to manufacture and to maintain close tolerances. In any manufacturing process however, discrepancies inevitably occur so that may accumulate to provide a variation of output between seemingly identical transducers. As a result, the response of a transducer may vary from unit to unit and may also be nonlinear. Both aspects complicate the use of the transducer in an integrated system.

It is therefore an object of the present invention to provide a flow transducer to obviate or mitigate the above disadvantages.

In general terms, the present invention provides a flow transducer to measure the rate of flow of a fluid in a conduit comprising a body, including a sleeve to be inserted in said conduit and present a barrier to flow in the conduit, a piston slidable within said sleeve and having first and second oppositely directed fluid reaction surfaces, one of which is subjected to fluid pressure on one side of said sleeve and the other of which is subject to fluid pressure on the opposite side of said sleeve, an aperture formed in said sleeve and a port in said piston and movable relative to said aperture define an orifice for fluid flow from one side of said sleeve to the other, biasing means acting between said piston and said body to bias said piston to a predetermined position in which flow past said sleeve is prevented, and a signal generating means associated with said piston to provide a signal indicative of the rate of fluid flow through said orifice, said signalling means including a position sensor to determine the position of said piston relative to a predetermined position and provide a first signal indicative thereof and a signal correlation means for correlating said first signal to a predetermined output indicative of the flow rate through said orifice.

An embodiment of the invention will now be described with reference to the accompanying drawings in which FIG. 1 shows a section through a flow transducer.

FIG. 2 shows a lookup table implemented in the control of FIG. 1.

Referring therefore to the drawing, a flow transducer 10 is located within a conduit 12. The transducer 10 includes a body 14 which has an external thread 16 received in a threaded bore 18 on the wall of the conduit 12. A cylindrical sleeve 20 depends from the body 14 and has a circumferential groove 22 at its lower end that carries an O-ring 24. The O-ring 24 is in sealing engagement with the wall of the conduit 12 so that the sleeve 20 acts as a barrier to fluid flowing through the conduit 12.

Two sets of apertures 26,28 respectively are provided in axially spaced locations on the sleeve 20. Each of the sets of apertures 26,28 includes four circumferentially spaced apertures that extend from the exterior wall of the sleeve 20 to the interior wall. The apertures are formed as, rectangular slots whose length extends around the circumference of the sleeve 20. As such, fluid may flow past the barrier provided by the sleeve 20 by passing through either of the apertures 26 or 28.

A piston 30 is slidably mounted within the sleeve 20 and has a set of ports 32 extending between an inner surface 34 and an outer surface 36. An annular groove 38 extends around the outer surface 36 between the ports 32. The groove 38 is dimensioned so as to extend between but not intercept the peripheries of the apertures 26,28 while allowing the outer surface 36 to maintain a sealing engagement with each of the apertures. In the position shown in the drawing, fluid flow through the apertures 26,28 is prevented but axial movement of the piston 30 to either side of that position will allow flow through one or the other of the apertures.

The piston 30 includes an extension 40 that extends into a cavity 41 formed in the body 14. The extension 40 includes a flange 42 adjacent one end and carries an insert 44 of a magnetic material beyond the flange 42. The location of the flange 42 relative to the piston 30 is determined by a shoulder 43 formed in the extension 40 which abuts the end face 45 of piston 30. The distance between the flange 42 and end face 45 can thus be accurately maintained.

The magnetic insert 44 carried by extension 40 is slidably received within a bore 46 formed in an end cap 48 that is received within the body 14 to define one end of the cavity 41. The end cap 48 is bored as indicated at 50 to receive a transducer 52 of the Hall effect type in close proximity to the bore 46. The transducer 52 is sealed within the bore 50 by an epoxy resin 54 which locates the transducer 52 firmly within the end cap 48.

The end cap 48 includes a shoulder 56 that projects radially inwardly from the body 14. An annular disc 58 is located on the extension 40 below the flange 42 and extends radially to the shoulder 56. The disc 58 is free to slide on the extension 40 but axial movement is limited by either the shoulder 56 or the flange 42.

A coil spring 60 is located within the cavity 42 around the extension 40 and one end bears against the disc 58. The opposite end of the spring 60 bears against a similar disc 62 which is also free to slide relative to the extension member 40 and extends radially outwardly to abut a radial shoulder 64 at the lower end of the cavity 41. The disc 62 also abuts an end face 45 of the piston 30.

Axial extension of the spring 60 is thus limited by the abutment of the discs 58,62 with the shoulders 56,64 respectively but movement of the piston 30 axially within the sleeve 20 will cause movement of one of the discs 58,62 and compression of the spring 60. The spring 60 thus acts to maintain the piston 30 with the groove 38 centered between the apertures 24,26 so that a barrier to flow in the conduit 12 is provided. The spacing between the shoulders 56,64 corresponds to the spacing between the flange 42 and the end face 45 so that when the discs 56,62 abut the shoulders 56,64, they also abut the flange 42 and end face 45. The piston 30 is thus maintained centred by physical abutments rather than the characteristics of spring 60.

It will also be noted that the disc 62 includes an annular rib 82 which is received within a recess 84 formed on the end face 66. The rib 82 co-operates with the recess to ensure that the disc 62 remains centered on the end face 66 of the piston 30. An oppositely directed rib 86 is provided on the radially inner edge of the disc 62 to locate the spring 60. A similar rib 88 is provided on the disc 58 to locate the opposite end of the disc 58. The location of the discs 58,62 provided by the ribs maintains the spring 60 centered and avoids hysteresis of the piston 30 as it moves axially against the spring 60.

The sleeve 20 thus effectively divides the conduit 12 into upstream and downstream portions which, for the direction of flow indicated by arrow A, are designated 68,70 respectively. It will, however, be understood that with the embodiment shown in the drawings the direction of flow may be reversed so that portion 70 becomes the upstream and portion 68 becomes the downstream portion.

A duct 72 in the body 14 provides fluid communication between the downstream portion 70 and the cavity 42. Duct 72 communicates with an axial groove 74 formed in the outer surface 36 of the piston 30 so that fluid pressure in the downstream portion 70 acts on the radial face 45 of the piston 30. An alignment between the duct 72 and the groove 74 is maintained by a pin 76 acting between the body 14 and a groove 78 to inhibit rotation of the piston 30 within the sleeve 20. Pin 76 also maintains alignment between the transducer 52 and magnetic insert 44 so that non-uniformities in the field of the insert 44 about its circumference will not produce erroneous signals from the transducer 52.

The piston 30 also presents a radial face 80 to the fluid in the upstream portion 68. The piston 30 is thus subjected to oppositely acting axial forces derived by the pressure on the faces 80 and 66. Any difference in those pressures will tend to act against the spring 60 and move the piston 30 axially within the sleeve 20 and allow the groove 38 to uncover one of the apertures 26,28.

In operation, therefore, the pressures in the upstream and downstream portions 68,70 respectively will be equal if there is no flow through the conduit 12. In this condition, the pressure forces acting on the piston 30 are equal and opposite and the piston 30 is located by the shoulders 56,64 in a position such that flow through the apertures 26,28 is prohibited.

Upon flow of fluid through the conduit 12 from the upstream portion 68 to the downstream portion 70, the pressure in the upstream portion will initially increase, causing the pressure forces on the face 80 to be greater than those on the face 66. The piston 30 thus moves axially within the sleeve 30 and causes the groove 38 to overlap the apertures 26. In this position, the fluid can flow from the upstream portion through the orifice defined by the overlapping of the aperture 26 with the groove 38 and into the downstream portion 70. Because of the flow through the orifice 26, a pressure differential will exist between the upstream and downstream portion 68,70 so that the pressure forces acting on the face 66 will be less than those on the face 80. The piston 30 will thus move axially upwardly as viewed in the drawings so that the piston face 66 moves toward the shoulder 56. The piston 30 carries the disc 62 with it as it moves axially upwardly but movement of the disc 58 is prohibited by the shoulder 56. The coil spring 60 is thus compressed and the force provided by the spring 60 on the piston 30 increases. The piston 30 will move to a position in which the pressure differential through the orifice 26 is balanced by the force of the spring 60. However, as the piston 30 moves the area of orifice also increases so that the range of pressure differentials across the piston over the range of flows will be less than would be experienced with a fixed orifice. Thus, for each flow rate through the conduit 12, the piston will adopt a particular position. Movement of the piston 30 is detected by the movement of the magnetic insert relative to the Hall effect transducer 52 and a voltage signal provided for each position of the piston. Thus, a signal is provided from the transducer 52 that is indicative of the rate of flow of fluid through the conduit 12. As the flow increases, the pressure differential across the piston 30 will increase and the piston 30 will move to a new position in which the spring 60 is further compressed and the forces acting on the piston again balanced. The transducer 52 thus provides a new signal indicative of the new flow rate.

If the flow of fluid reverses within the conduit 12 such that the portion 70 becomes the upstream portion and the portion 68 becomes the downstream portion, the pressure forces on face 66 will be greater than those acting on face 80. Thus, the piston 30 will move downwardly such that the disc 58 is carried by the flange 42 toward the shoulder 64. Again, the spring 60 is compressed until the forces acting on the piston are balanced. The insert 44 varies the signal from the Hall effect transducer 52 so that a unique signal is provided that indicates not only the flow rate but also the direction of flow of fluid within the conduit 12.

The transducer is calibrated against a master transducer or by specific flow measurement of the fluid. Conveniently, end cap 48 accomodates a microprocessor 80 that records the movement of the piston for a given flow rate and correlates it to a predetermined output signal for that flow rate. Thus as shown in FIG. 2, for each calibrated flow rate $Q_1$, $Q_2$ etc. the signal representing the position $X_1$, $X_2$ etc. of the spool is noted. Each calibrated flow $Q_1$, $Q_2$ etc. is also set to produce respective predetermined output signal $V_1$, $V_2$ etc. The correlated values of $X_1$, $V_1$ . . . are recorded as a lookup table in the microprocessor 80 with interpolations if necessary to provide the required resolution.

In use, as a position signal $X_n$ is received, a voltage $V_n$ is produced as the output signal indicating a predefined flow rate. The signal $V_n$ will be common to all transducers 10 for a given flow rate, regardless of the internal characteristics of the spool. In this way, the transducers are interchangeable even if their piston displacement varies from transducer to transducer.

Moreover, any non-linearities in the response may be removed to provide a predictable output signal over the full flow range.

It will be seen, therefore, that the transducer 10 provides a simple yet robust transducer that provides a signal indicative of flow rates and whose output varies as the flow in the conduit 12 varies. In view of the fact that the position of the piston 30 is acted upon directly by fluid flowing through the apertures 24,26, it will be apparent that a dynamic measurement of the flow rate is provided and any fluctuations will cause a corresponding movement of the piston 30. The null position of the piston is maintained positively and a single spring is used to balance motion in each direction and thereby minimize manufacturing difficulties.

I claim:

1. A flow transducer to measure the rate of flow of a fluid in a conduit comprising a body including a sleeve to be inserted in said conduit and present a barrier to flow in the conduit, a piston slidable within said sleeve and having first and second oppositely directed fluid reaction surfaces, one of which is subjected to fluid pressure on one side of said sleeve and the other of which is subject to fluid pressure on the opposite side of said sleeve, an aperture formed in said sleeve and a port in said piston and movable relative to said aperture define an orifice for fluid flow from one side of said sleeve to the other, biasing means acting between said piston and said body to bias said piston to a predetermined position in which flow past said sleeve is prevented, and a signal generating means associated with said piston to provide a signal indicative of the rate of fluid flow through said orifice, said signalling means including a position sensor to determine the position of said piston relative to a predetermined position and provide a first signal indicative thereof and a signal correlation means for correlating said first signal to a predetermined output indicative of the flow rate through said orifice at the sensed position.

2. A flow transducer according to claim 1 wherein said signal correlation means includes a microprocessor having a lookup table therein to correlate said first signal to said predetermined output.

3. A flow transducer according to claim 2 wherein said position sensor includes a magnetic element secured to said piston and a Hall effect sensor located in said body.

4. A flow transducer according to claim 3 wherein said microprocessor is located within a cap surmounting said body.

5. A flow transducer according to claim 2 wherein said body includes a pair of apertures spaced apart in the direction of movement of said piston and said biasing means biases said piston to said predetermined position in which said port is axially located between said apertures.

* * * * *